US008305188B2

(12) United States Patent  
Tran et al.

(10) Patent No.: US 8,305,188 B2  
(45) Date of Patent: Nov. 6, 2012

(54) SYSTEM AND METHOD FOR LOGGING IN MULTIPLE USERS TO A CONSUMER ELECTRONICS DEVICE BY DETECTING GESTURES WITH A SENSORY DEVICE

(75) Inventors: Dang Tran, Laguna Niguel, CA (US); Daniel Gicklhorn, Irvine, CA (US); Andrew Shelansky, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 455 days.

(21) Appl. No.: 12/575,417

(22) Filed: Oct. 7, 2009

(65) Prior Publication Data

US 2011/0080254 A1 Apr. 7, 2011

(51) Int. Cl.

| G05B 19/00 | (2006.01) |
|---|---|
| G05B 23/00 | (2006.01) |
| G06F 7/00 | (2006.01) |
| G06F 7/04 | (2006.01) |
| G06F 3/033 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |
| G09G 5/00 | (2006.01) |

(52) U.S. Cl. .......................... 340/5.1; 715/863; 345/156
(58) Field of Classification Search .................. 340/5.1; 715/863; 345/156

See application file for complete search history.

(56) References Cited

U.S. PATENT DOCUMENTS

| 2003/0113018 A1* | 6/2003 | Nefian et al. .................. 382/181 |
|---|---|---|
| 2006/0010400 A1* | 1/2006 | Dehlin et al. .................. 715/856 |
| 2006/0222214 A1* | 10/2006 | Kaneda et al. ................. 382/115 |
| 2007/0060336 A1* | 3/2007 | Marks et al. ..................... 463/30 |
| 2007/0298882 A1* | 12/2007 | Marks et al. ..................... 463/36 |
| 2008/0019589 A1* | 1/2008 | Yoon et al. ..................... 382/165 |
| 2008/0080789 A1* | 4/2008 | Marks et al. .................. 382/296 |
| 2008/0100825 A1* | 5/2008 | Zalewski ......................... 356/29 |
| 2008/0168403 A1* | 7/2008 | Westerman et al. ........... 715/863 |
| 2009/0079813 A1* | 3/2009 | Hildreth ..................... 348/14.03 |
| 2009/0217211 A1* | 8/2009 | Hildreth et al. ............... 715/863 |
| 2009/0278915 A1* | 11/2009 | Kramer et al. .................. 348/48 |
| 2010/0054534 A1* | 3/2010 | Zheng et al. .................. 382/103 |
| 2010/0219934 A1* | 9/2010 | Matsumoto ..................... 340/5.1 |
| 2010/0302138 A1* | 12/2010 | Poot et al. ..................... 345/156 |

* cited by examiner

*Primary Examiner* — Daniel Wu  
*Assistant Examiner* — Kam Ma  
(74) *Attorney, Agent, or Firm* — Beyer Law Group LLP

(57) ABSTRACT

A system and method of maintaining login state information is disclosed. In one embodiment a system comprises a memory configured to store login state information, a camera configured to capture an image, and a processor configured to determine, based at least in part on the image data, a location of a central object associated with the user, to determine, based at least in part on the image data, a location of a satellite object associated with the central object, to determine, based at least in part on the location of the central object and the location of the satellite objection, an angle, and to modify, based at least in part on the angle, the login state information to indicate that the user has logged in.

19 Claims, 7 Drawing Sheets

SYSTEM AND METHOD FOR LOGGING IN MULTIPLE USERS TO A CONSUMER ELECTRONICS DEVICE BY DETECTING GESTURES WITH A SENSORY DEVICE

BACKGROUND

1. Field

This application relates to user control of and user interaction with televisions and other media devices.

2. Description of the Related Technology

Early, televisions were controlled using predefined function buttons located on the television itself. Wired remote controls were later developed to allow users to access functionality of the television without needing to be within physical reach of the television. Similarly, electronic gaming systems were developed which allow multiple users remote input to the system via wired game controllers. Eventually, the wires were replaced with wireless transmitters and receivers. However, as televisions and other consumer electronics have become more feature-rich, the number of buttons on remote consumer electronic input devices, such as television remote controls and game controllers, has increased correspondingly. As a result, users have been required to remember, search, and use a large number of buttons in order to access the full functionality of the device. More recently, the use of hand gestures has been proposed to control such devices.

SUMMARY OF CERTAIN INVENTIVE ASPECTS

The systems and methods of the development each have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description of Certain Inventive Embodiments" one will understand how the sample features of this development provide advantages that include allowing multiple users to login using gestures.

One aspect is a system for maintaining login state information, the system comprising a memory configured to store login state information, a camera configured to capture an image, and a processor configured to determine, based at least in part on the image data, a location of a central object associated with the user, determine, based at least in part on the image data, a location of a satellite object associated with the central object, and modify, based at least in part on the relative location of the satellite object with respect to the location of the central object, the login state information to indicate that the user has logged in.

Another aspect is a method of maintaining login state information, the method comprising receiving image data, determining, based at least in part on the image data, a location of a central object associated with a user, determining, based at least in part on the image data, a location of a satellite object associated with the central object, and modifying, based at least in part on the relative location of the satellite object with respect to the location of the central object, the login state information to indicate that the user has logged in.

Another aspect is a system for maintaining login state information, the system comprising means for receiving image data, means for determining, based at least in part on the image data, a location of a central object associated with a user, means for determining, based at least in part on the image data, a location of a satellite object associated with the central object, and means for modifying, based at least in part on the relative location of the satellite object with respect to the location of the central object, the login state information to indicate that the user has logged in.

Yet another aspect is a computer-readable storage medium having computer-executable code stored thereon which, when executed by a computer, causes the computer to perform a method of maintaining login state information, the method comprising receiving image data, determining, based at least in part on the image data, a location of a central object associated with a user, determining, based at least in part on the image data, a location of a satellite object associated with the central object, and modifying, based at least in part on the relative location of the satellite object with respect to the location of the central object, the login state information to indicate that the user has logged in.

DETAILED DESCRIPTION OF CERTAIN INVENTIVE EMBODIMENTS

The following detailed description is directed to certain specific aspects of the development. However, the development can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may performed by one or more computer processors configured to execute instructions retrieved from a computer-readable storage medium. A computer-readable storage medium stores information, such as data or instructions, for some interval of time, such that the information can be read by a computer during that interval of time. Examples of computer-readable storage media are memory, such as random access memory (RAM), and storage, such as hard drives, optical discs, flash memory, floppy disks, magnetic tape, paper tape, punch cards, and Zip drives.

Control of media devices, such as televisions, cable boxes, or DVD players, is often accomplished by the user of such devices through the use of a wireless remote input device. However, such a device is often frustratingly complex and easily misplaced, forcing the user from the comfort of their viewing position to either attempt to find the remote input device or to manually change system parameters by interacting physically with the device itself. Control of electronic gaming systems is often accomplished by the user of such devices through the users of wired or wireless game controllers. Such a device can also be exceedingly complex and easily misplaced. Many electronic gaming systems cannot function when the game controller is unavailable, due to misplacement or loss of battery power.

Recent developments in digital imagery, digital video, and computer processing speed have enabled real-time human-machine interfaces that do not require additional hardware outside of the device. Examples of such interfaces are described at least in paragraphs [0021]-[0049] of U.S. application Ser. No. 12/037,033, filed Feb. 25, 2008, entitled "System and method for television control using hand gestures," which is herein incorporated by reference in its entirety. Embodiments disclosed herein include systems and method for controlling devices through the use of gestures detected by a video camera integrated with or operatively connected to the device. One specific embodiment is a method which allows multiple users to login to a consumer electronic device using gestures.

Figure 1:
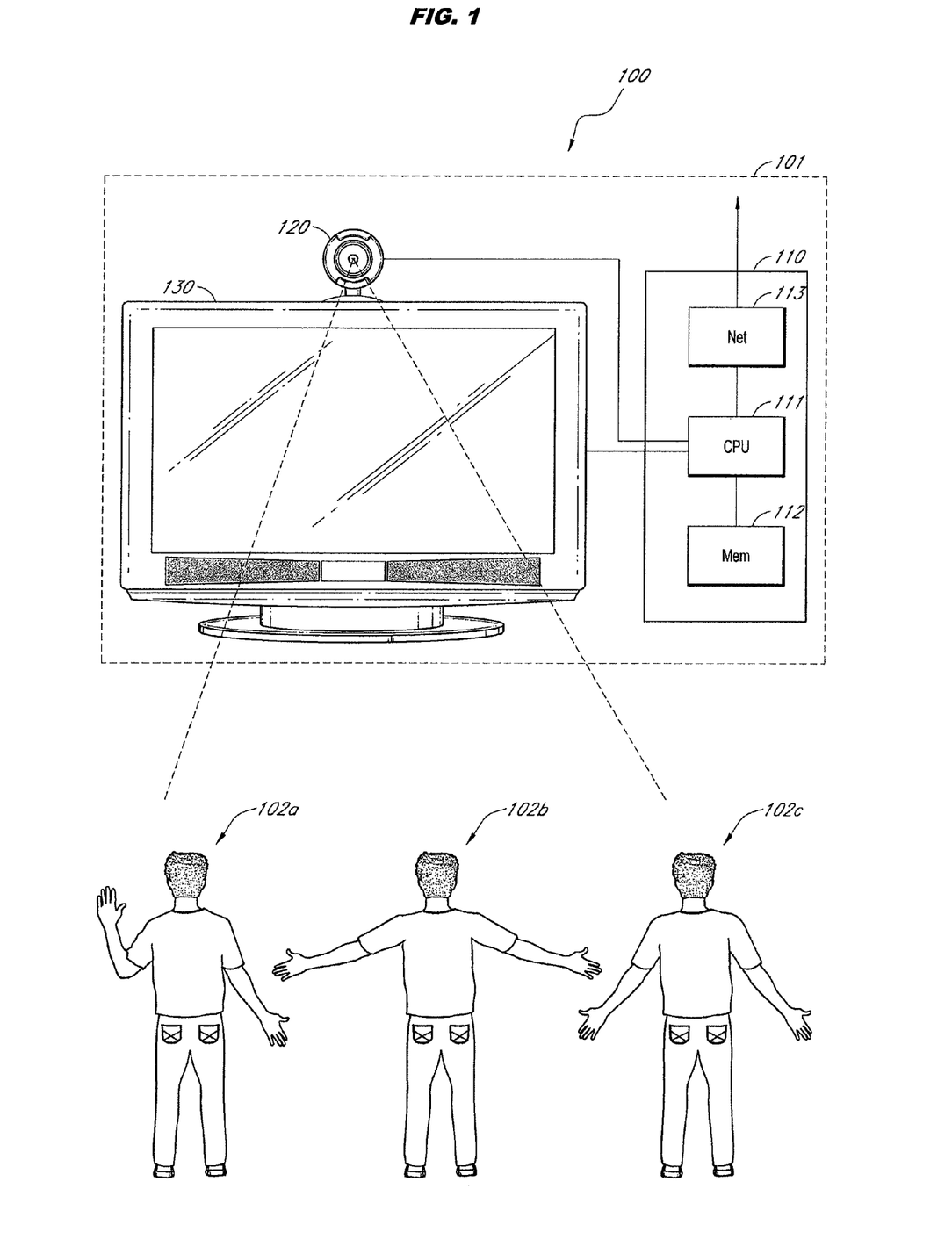
FIG. 1 is a functional block diagram of a suitable environment for control of a consumer electronic device via a human-machine interface.

An exemplary embodiment of a human-machine interface that does not require additional hardware outside of the device is described with respect to FIG. 1. FIG. 1 is a functional block diagram of a suitable environment 100 for control of a consumer electronic device via a human-machine interface. The environment 100 typically includes a consumer electronic device 101 to be controlled by one or more users 102a, 102b, 102c.

The consumer electronic device 101 is configured to interpret gestures from one or more of the users 102 and to alter system characteristics according to the gestures. In one embodiment, the consumer electronic device detects the relative position of the face and palms of the users in order to associate each user with a user account.

The consumer electronic device includes a control box 110, an input device 120, and an output device 130. In one embodiment, the control box 110, the input device 120, and the output device are integrated into a single unit, such as a television. In another embodiment, the control box 110 is separate from the input device 120 and the output device 130, but operatively connected to the input device 120 and output device 130 via a wired or wireless communication link.

The control box 110 includes, at least, a processor 111 in data communication with a memory 112. In one embodiment, the processor is further in data communication with a network interface 113. Although described separately, it is to be appreciated that functional blocks described with respect to the control box 110 need not be separate structural elements. For example, the processor 111 and memory 112 may be embodied in a single chip. Similarly, the processor 111 and network interface 113 may be embodied in a single chip.

The processor 111 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 111 is coupled, via one or more buses, to read information from or write information to the memory 112. The processor may additionally, or in the alternative, contain memory, such as processor registers. The memory 112 can include processor cache, including a multi-level hierarchical cache in which different levels have different capacities and access speeds. The memory 112 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

In one embodiment, the processor 111 can also receive and transmit information over a network using the network interface 113. The network interface 113 can include a network controller, or network card. The network card can be an Ethernet card with a unique 48-bit serial number called a MAC address stored in ROM (read-only memory) carried on the card. The network card can be an expansion card which plugs into a network bus or it can be a network interface built into a motherboard of the system unit. The control box 110 can communicate using the network interface over either wired or wireless links. In one embodiment, the network interface 113 allows users to communicate via an Internet Protocol network, such as the Internet.

The control box 110, and the processor 111 thereof, is also coupled to an input device 120 and an output device 130 for, respectively, receiving input from and providing output to, a user of the network management system 130. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, and a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

In one embodiment, the input device 120 is an image capture device. The image capture device 110 to capture images or video of hand gestures performed by one or more of the users 102. In some embodiments, the image capture device is controllable such that the user 102 being surveyed can be in various places or positions. In other embodiments, the image capture device is static and the hand gestures of the user 102 must be performed within the field of view of the image capture device. The image capture device can include cameras of varying complexity such as, for example, a "webcam" as is well-known in the computer field, or more sophisticated and technologically advanced cameras. The image capture device can capture the scene using visible light, infrared light, or another part of the electromagnetic spectrum.

In one embodiment, the output device 130 is a display, such as a computer monitor or a television screen. In one embodiment, the field of view of the display is approximately collocated with the field of view of the image capture device. The region in which the field of view of the image capture device and the field of view of the display device overlap shall be referred to herein as the active field of view. Users 102 with the active field of view can view the display and be viewed by the image capture device.

Figure 2:
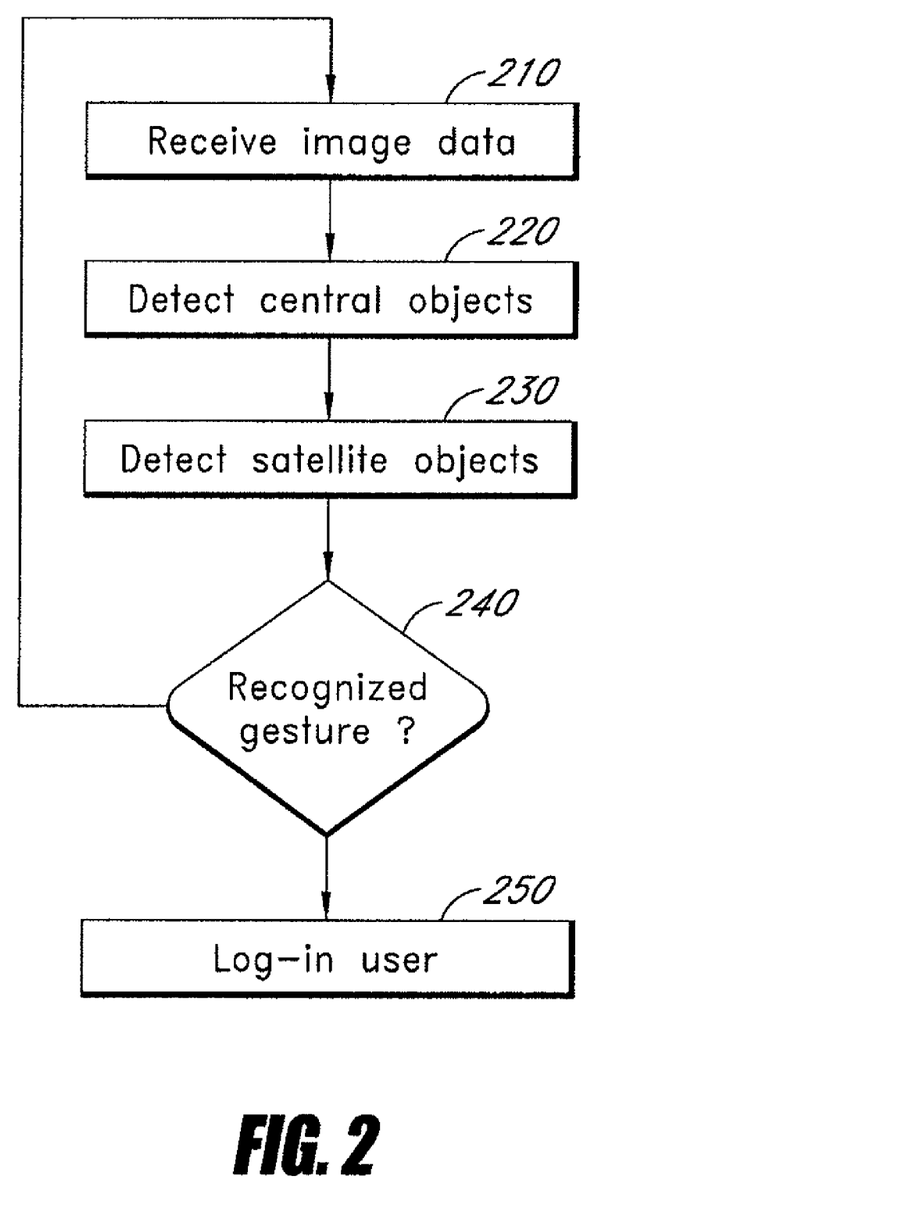
FIG. 2 is a flowchart illustrating a method of logging in multiple users.

In one embodiment, the processor 111 executes software stored in the memory 112 to perform a method of logging in multiple users. FIG. 2 is a flowchart illustrating a method of logging in multiple users. The process 200 begins in block 210 in which the processor 111 receives image data. The processor 111 can receive the image data from the input device 120 which, as mentioned above, can include a camera.

Next, in block 220, the processor 111 detects one or more central objects and assigns each detected central object a set of coordinates. In block 230, the processor 111 detects one or more satellite objects assigns each detected satellite object a set of coordinates and a detected central object. In one embodiment, the central objects are faces of the users 102, whereas the satellite objects are hands or palms of the users 102.

Systems and methods for detecting central objects, such as faces or other objects, are described at least in paragraphs [0026]-[0054] of U.S. application Ser. No. 12/122,393, filed May 16, 2008, entitled "System and method for object detection and classification with multiple threshold adaptive boosting," which is herein incorporated by reference in its entirety. Systems and methods for detecting satellite objects, such as human hands or other objects are described at least in paragraphs [0018]-[0074] of U.S. application Ser. No. 12/141,824, filed Jun. 18, 2008, entitled "System and method for class-specific object segmentation of image data," which is herein incorporated by reference in its entirety. Systems and method for detecting human skin in an image, which may also be useful in detecting central and/or satellite objects, are described at least in paragraphs [0015]-[0055] of U.S. application Ser. No. 12/126,688, filed May 23, 2008, entitled "System and method for human hand motion detection by skin color prediction," which is herein incorporated by reference in its entirety.

Although the examples described herein are generally directed to the detection of human faces as central objects and human palms as satellite objects, it is to be appreciated that other central objects and satellite objects can similarly be detected. For example, the central objects can include masks or hats worn by the users that are easily detected by the system by virtue of their color or brightness. The central objects can include other clothing or equipment worn by the users. The satellite objects can include gloves worn by the users, or other equipment held in the hands of the users, that are easily detected by the system by virtue of their color or brightness.

As mentioned above, each detected central object is assigned a set of coordinates. In one embodiment, x,y-coordinates are used. Further, each detected satellite object is assigned a set of coordinates and is also associated with one of the detected central objects. In one embodiment, the satellite object is associated with the closest (in x,y-coordinate space) central object. In another embodiment, the satellite object is determined to be a left hand or a right hand and is associated with the closest central object to the left or right, respectively, of the satellite object. In another embodiment, each central object is limited so as to only be associated with two or fewer satellite objects. Thus, if a central object is associated with two satellite objects, another satellite object may be associated with a central object which is not the closest central object, but the closest central object with less than two satellite objects associated therewith.

Next, in decision block 240, the processor 111 uses the detected locations of the central objects and the satellite objects to determine if the locations define a recognized gesture. A database or table of recognized gestures can be stored in the memory 112. In one embodiment, the locations of central objects and the locations of associated satellite objects are used to determine one or more angles associated with the central objects. Methods of determining these angles are described at least in paragraphs [0023]-[0047] of U.S. application Ser. No. 12/199,749, filed Aug. 27, 2008, entitled "System and method for interacting with a media device using faces and palms of video display users," which is herein incorporated by reference in its entirety. Method of determining angles based on the locations of the central objects and associated satellite objects are also described below with respect to FIGS. 3 and 4. In one embodiment, the processor 111 determines if the recognized gesture is a login gesture, or one of a plurality of login gestures. In this case, it is not necessary for the processor 111 to determine if the locations of central objects and associated satellite objects define a recognized gesture for central objects associated with users previously logged in.

As mentioned above, in one embodiment, the locations of central objects and associated satellite objects are used to determine one or more angles associated with the central objects. In one embodiment, two angles are determined, including a left hand angle, $\theta_L$, and a right hand angle, $\theta_R$, each angle determined using the location the central object, the location of one associated satellite object, and predefined horizontal. These two angles are used to determine if the locations define a recognized login gesture by comparing the angles to a table of login gestures. An example of a table of login gestures is shown below in Table 1.

TABLE 1

Exemplary Login Gestures

| Left Hand Angle, $\theta_L$ (deg) | Right Hand Angle, $\theta_R$ (deg) | Profile Identifier |
|---|---|---|
| $\theta_L > 30$ | $-30 < \theta_R < 30$ | Red |
| $-30 < \theta_L < 30$ | $30 < \theta_R$ | Green |
| $\theta_L < -30$ | $-30 < \theta_R < 30$ | Yellow |
| $-30 < \theta_L < 30$ | $\theta_R < -30$ | Blue |

It is to be appreciated that the gestures defined in Table 1 are simply exemplary gestures. Gestures can be defined in any circular, planar, or angular metric, including radians, degrees, mils, or grads. This metric may divide the unit space in any logical manner, such as halves, quarters, eighths, or irregularly. Divisions can be described to begin or end at any point and can provide a continuous ordering or a terminating ordering. Further, although Table 1 illustrates a left hand angle and a right hand angle, the satellite object can be other than a hand or palm as described above.

If it is not determined that the locations define a recognized gesture, the process 200 starts over at block 210, wherein image data is received. If it is determined that the locations define a recognized gesture, the process 200 continues to block 250, where the user 102 corresponding to the central objects and associated satellite objects is logged in. A user is logged in when and while login state information stored in a memory so indicates. In one embodiment, the processor 111 generates a profile for the user indicating that the user is logged in and stores the profile in the memory 112. The profile can further store additional information associated with the user such as a profile identifier, the position of the central object associated with the user, or a region of the camera's field of view associated with the user. In one embodiment, upon logging in a user, the consumer electronic device 101 provides feedback that the user is logged in via the output device 130. For example, the consumer electronic device 101 can display an indication that a user is logged in, produce an audio confirmation that a user has logged in, or activate one of a number of LEDs indicating that a particular user is currently logged in.

Figure 3:
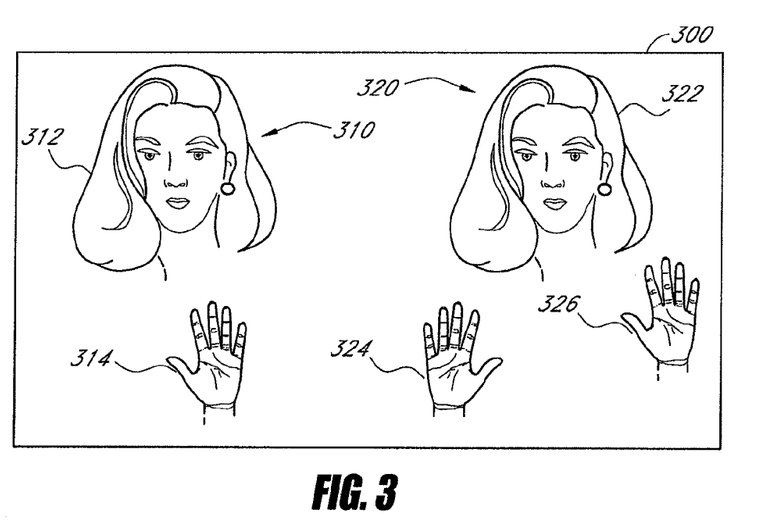
FIG. 3 is a diagram of exemplary image data.

As mentioned above, the determined locations of the central objects and associated satellite objects can be used to determine an angle associated with each central object. One method of determining such angles is described with respect to FIGS. 3 and 4. FIG. 3 is a diagram of exemplary image data which may be captured by the input device 120. The image 300 of FIG. 3 includes a first user 310 and a second user 320. The image 300 includes the face of the first user 312 and a palm of the first user 314 as well as the face of the second user 322, a right palm of the second user 324 and a left palm of the second user 326.

Figure 4:
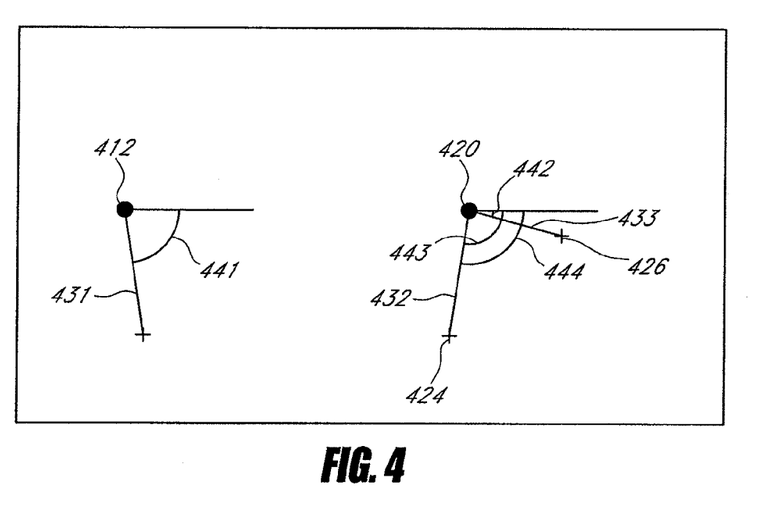
FIG. 4 is a diagram illustrating exemplary locations of central objects, locations of associated satellite objects, and angle calculations based on the locations which may be generated based on the image of FIG. 3.

FIG. 4 is a diagram illustrating exemplary locations of central objects, locations of associated satellite objects, and angle calculations based on the locations which may be generated based on the image of FIG. 3. A face detection algorithm, such as that described in U.S. application Ser. No. 12/122,393 incorporated above, outputs coordinates indicative of the location of a face in an image. Thus, the output of such an algorithm applied to the image 300 of FIG. 3 may output the coordinates marked in FIG. 4 by the first central point 412 and the second central point 422. Similarly, a palm detection algorithm, such as that described in U.S. application Ser. No. 12/141,824 incorporated above, outputs coordinates indicative of the location of a palm in an image. Thus, the output of such an algorithm applied to the image 300 of FIG. 3 may output the coordinates marked in FIG. 4 by the first satellite point 414, the second satellite point 424, and the third satellite point 426.

In one embodiment, each of the coordinates are represented as vectors having an x-value and a y-value representing their relative horizontal and vertical location, respectively, in the image of FIG. 3.

In one embodiment, each satellite point is associated with a single central point. This associate may be based on the distance between a satellite point and the central points. For example, each satellite point may be associated with its nearest central point.

In one embodiment, an angle is determined based on a central point and a single associated satellite point. Such an embodiment is described with respect to the first central point 412 and the first satellite point 414. The first central point 412 and the first satellite point 414 define a first ray 431. The angle between this ray and the horizontal, marked by the first arc 441, can be calculated as follows:

$$\theta = \sin^{-1}\left(\frac{y_s - y_c}{\sqrt{(x_s - x_c)^2 + (y_s - y_c)^2}}\right),$$

wherein $x_s$ and $y_s$ are the x- and y-coordinates of the satellite point 414 and $x_c$ and $y_c$ are the x- and y-coordinates of the central point 412. The angle can also be calculated as follow, or by other methods known to those in the art:

$$\theta = \cos^{-1}\left(\frac{x_s - x_c}{\sqrt{(x_s - x_c)^2 + (y_s - y_c)^2}}\right).$$

The second central point 422 and the second satellite point 424 define a second ray 432 which can also be used in a similar manner to define an angle marked by the second arc 442. Similarly, the second central point 422 and the third satellite point 426 define a third ray 433 which can be used to define an angle marked by the third arc 443.

The second ray 432 and third ray 433 can also be used to define an angle irrespective a predefined horizontal. This angle, marked by the arc 444 can be calculated as the difference between the angle marked by arc 443 and the angle marked by arc 442. This angle can also be calculated by other methods known to those skilled in the art.

As mentioned above, the profile information stored in the memory 112 can store a profile identifier. In one embodiment, the profile identifier is generated by the processor 111 upon determining that the recognized gesture is associated with a profile identifier. For example, in Table 1 above, each login gesture is associated with a different profile identifier. In another embodiment, there is only one login gesture and each profile is assigned a profile identifier randomly or sequentially. It is to be appreciated that although colors are used as the profile identifiers in Table 1, other profile identifiers can be used, including letters and numbers.

As also mentioned above, the profile can store other information associated with the logged in user, including a region of the camera's field of view associated with the user. This region, herein referred to as a "hot zone," can be determined from the location of the central object associated with the user. In some embodiments, the locations of one or more of the associated satellite objects are also used to define the hot zone. In one embodiment, the hot zone is defined as a region of a predefined shape and size about the location of the central object. In another embodiment, the hot zone is a region of a size and shape determined by the locations of the central object and associated satellite objects.

When recognized gestures are detected within a hot zone associated with a particular profile, the gestures are associated with the particular profile and, transitively, the user associated with the particular profile. For example, in one embodiment, a logout gesture is stored in a database defined as a left hand angle between −30 degrees and 30 degrees and a right hand angle between −30 degrees and 30 degrees. If such a gesture is detected within a hot zone associated with a particular user, that user will be logged out of the device. In response, the profile stored in the memory 112 can be deleted or modified to indicate that the user is logged out.

In one embodiment, the processor 111 generates predefined triggers based on the data received from the input device 120. In response to the generation of these triggers, the consumer electronic device 101 can generate additional triggers or perform specific functions. A number of predefined triggers are described below, followed by a description of specific functions. Exemplary relationships between the triggers and functions are also described below.

Figure 5A:
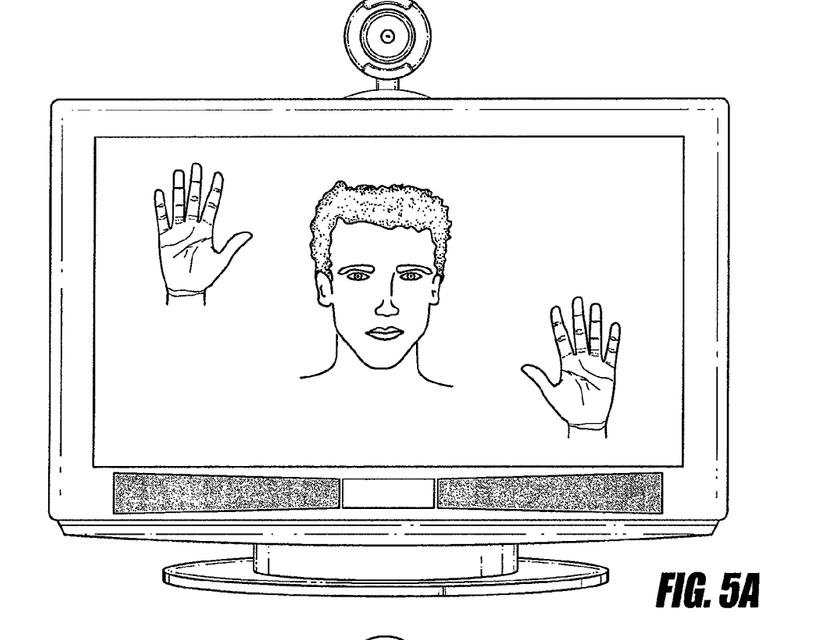
FIG. 5A illustrates exemplary image data in response to which a processor may generate a user login trigger.

A "user login" trigger can be generated by the processor 111 in response to determining that a recognized login gesture has been detected, as described above with respect to FIG. 2. The user login trigger can include data indicative of a profile identifier, a location of the detection, and a hot zone. When the user login trigger is generated in a hot zone associated with a logged in user, the processor 111 may, in response, redefine the hot zone. In this way, a user can proactively adjust the hot zone. FIG. 5A illustrates exemplary image data in response to which the processor 111 may generate a user login trigger.

Figure 5B:
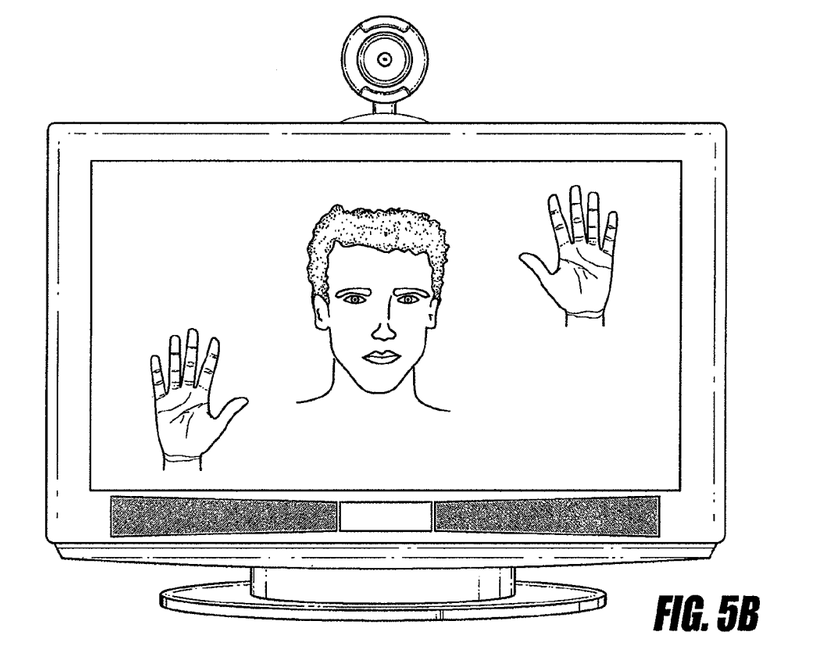
FIG. 5B illustrates exemplary image data in response to which a processor may generate a user logout trigger.

A "user logout" trigger can be generated by the processor 111 in response to determining that a recognized logout gesture has been detected within a hot zone associated with a user. A user logout trigger can also be generated by an internal system event requesting a user be logged out. For example, if a user is non-responsive, the user can be logged out by the consumer electronic device 102. FIG. 5B illustrates exemplary image data in response to which the processor 111 may generate a user logout trigger. Although the position of the hands and face of the user in FIG. 5B are illustrated as different than the positions in FIG. 5A, in other embodiments, the same gesture may be used to generate the user login and user logout triggers.

Figure 5C:
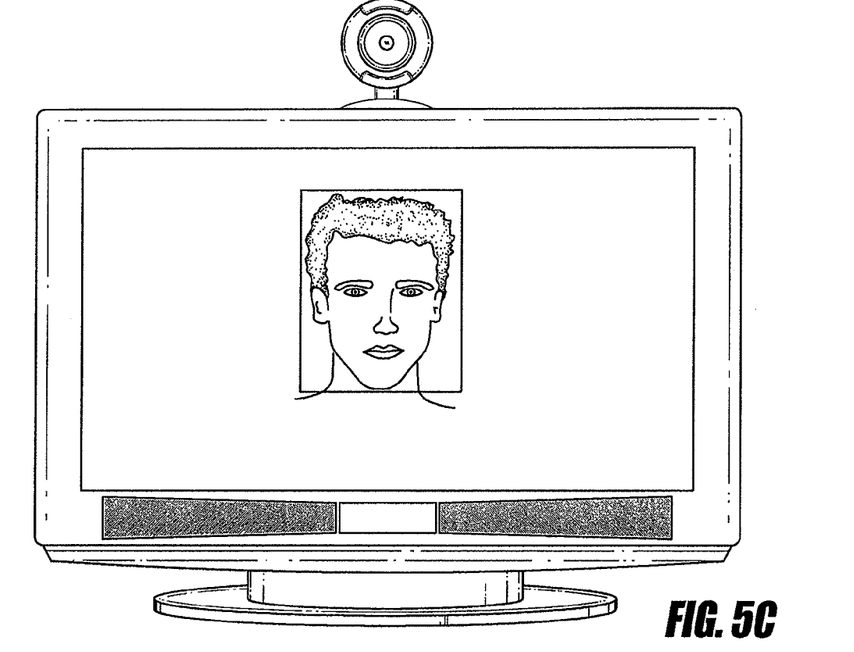
FIG. 5C illustrates exemplary image data in response to which a processor may generate a face detected trigger.

A "face detected" trigger can be generated by the processor 111 in response to detection of a face within the field of view of an image capture device. The face detected trigger can also be generated by the input device 120, such as when the input device includes an external detection system comprising an image capture device and a processor configured to detect faces (or other objects). The face detected trigger can also include data indicative of a location of the detection and a hot zone. The location of the detection can be a single point, perhaps the center of the face, or a region. FIG. 5C illustrates exemplary image data in response to which the processor 111 may generate a face detected trigger.

Figure 5D:
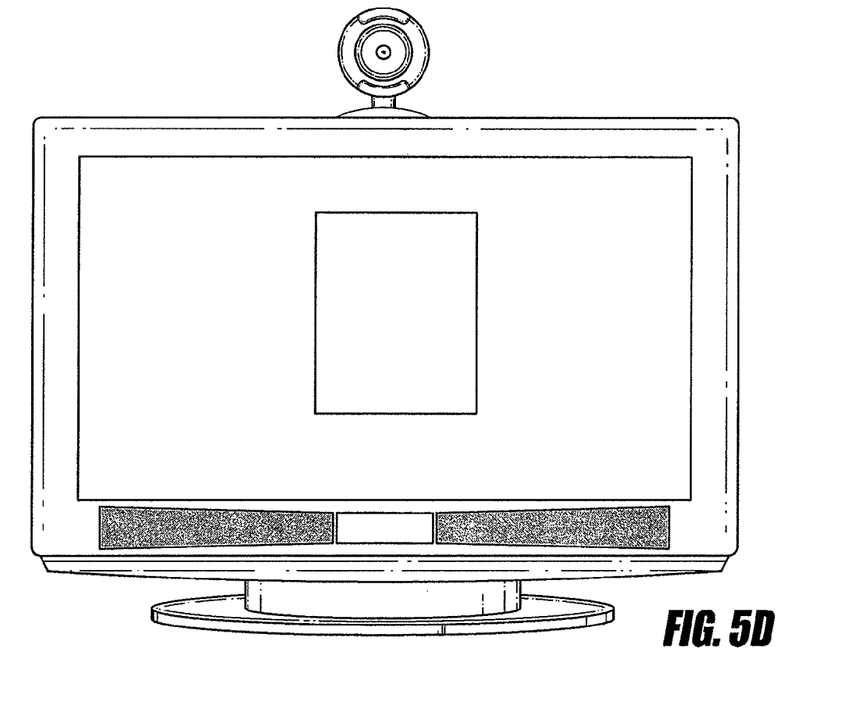
FIG. 5D illustrates exemplary image data in response to which a processor may generate a no face detected trigger.

A "no face detected" trigger can be generated by the processor 111 when an image is captured in which no face is detected with a hot zone. The no face detected trigger can indicate, for example, that a logged in user is out of the field of view of the camera. The no face detected trigger may also be generated due to a malfunction in the connection between the camera and the processor 111. In response to the no face trigger for a particular hot zone, or in response to repeatedly receiving or generating the no face trigger for a predetermined amount of time, the processor 111 may log the user out. FIG. 5D illustrates exemplary image data in response to which the processor 111 may generate a no face detected trigger.

Figure 5E:
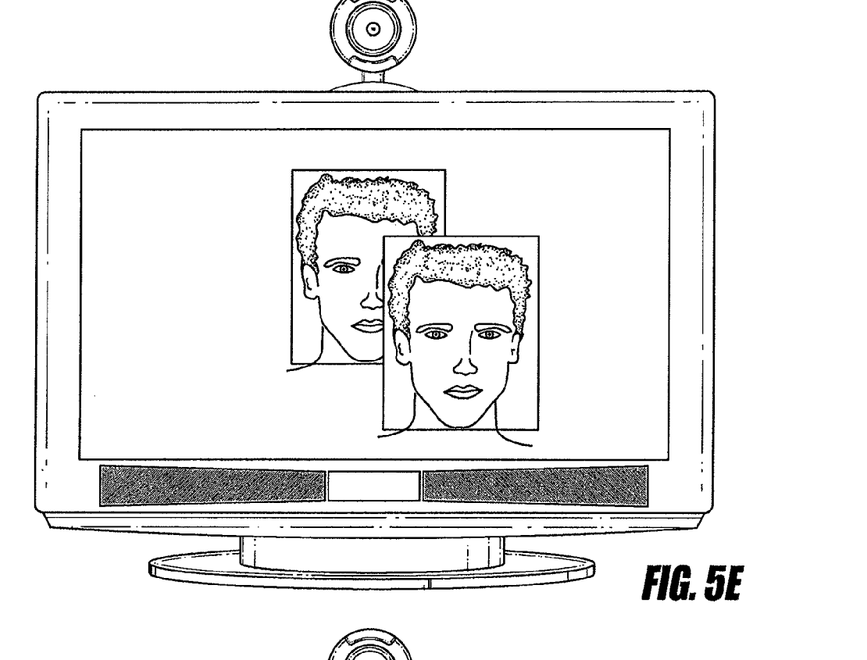
FIG. 5E illustrates exemplary image data in response to which a processor may generate a face crossover trigger.

A "face crossover" trigger can be generated by the processor 111 when two faces are detected within a predetermined range. The face crossover trigger can also be generated when hot zones associated with two users overlap. The face crossover trigger can be generated in response to the generation (or reception) of two face detected triggers indicating face detection locations overlapping or within a predetermined distance. The face crossover trigger can indicate that two users are too close together for efficient functioning of the consumer electronics device 102 or that two users 102 are exchanging seating locations. FIG. 5E illustrates exemplary image data in response to which the processor 111 may generate a face crossover trigger.

Figure 5F:
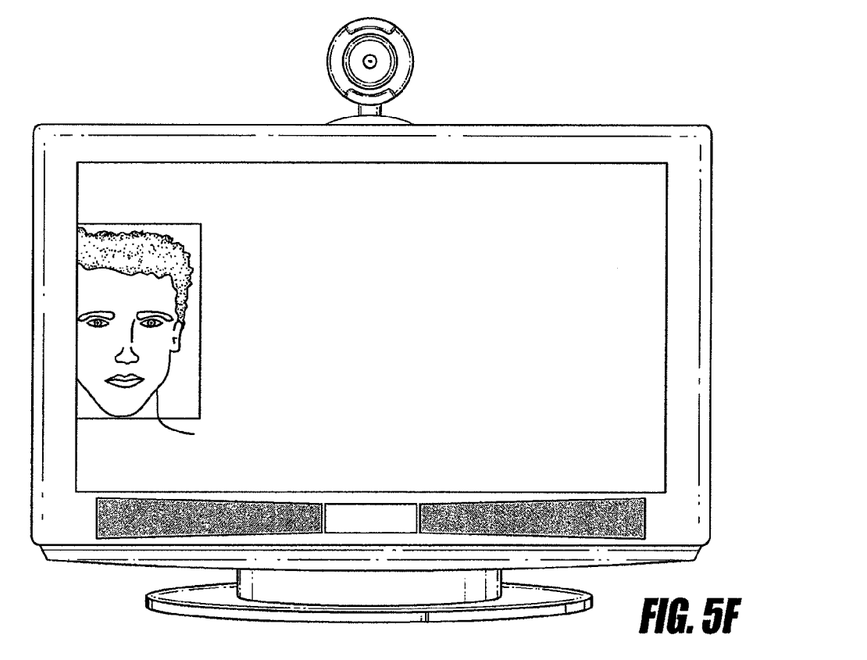
FIG. 5F illustrates exemplary image data in response to which a processor may generate a face edge trigger.

A "face edge" trigger can be generated by the processor 111 when a face is detected within predetermined distance of an edge of the field of view of the camera. The predetermined distance may be different for different edges of the field of view, for example, the top edge and the left edge. In response to the face edge trigger, the processor 111 can generate an alert, described below, indicating that a particular user is nearing the edge of the camera's field of view. FIG. 5F illustrates exemplary image data in response to which the processor 111 may generate a face edge trigger.

Figure 5G:
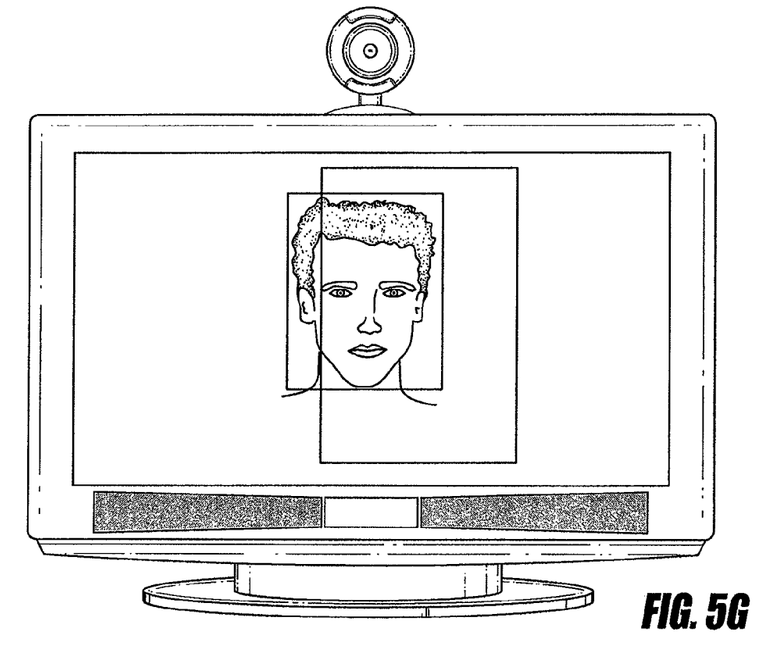
FIG. 5G illustrates exemplary image data in response to which a processor may generate a horizontal face out trigger.

A "face out" trigger can be generated by the processor 111 when a face is detected in near or intersecting the edge of a hot zone. For example, the face out trigger can be generated when a face detected trigger indicates that a face detected region intersects the edge of the hot zone. The face out trigger can also be generated when a face detected point is within a predetermined distance of the hot zone. In one embodiment, when a face detected trigger indicates the detection of a face near, but outside of an empty hot zone, the "face out" trigger is generated. In another embodiment, the "no face detected" trigger is generated in the same scenario. FIG. 5G illustrates exemplary image data in response to which the processor 111 may generate a face out trigger.

Figure 5H:
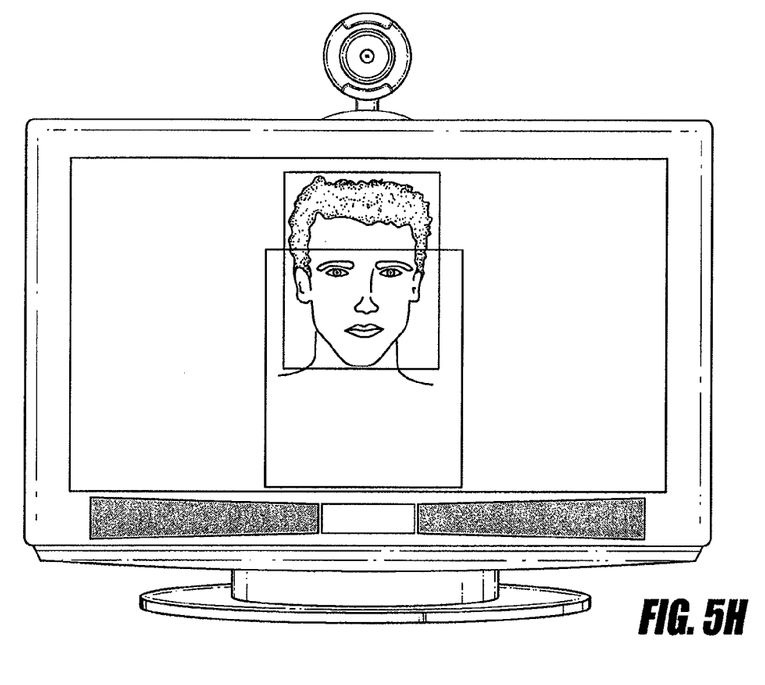
FIG. 5H illustrates exemplary image data in response to which a processor may generate a vertical face out trigger.

In one embodiment, there are two "face out" triggers, a "horizontal face out" trigger generated when a face is detected within a predetermined distance of a horizontal edge of the hot zone and a "vertical face out" trigger generated when a face is detected within a predetermined distance of a vertical edge of the hot zone. The "vertical face out" trigger may indicate that a user has stood up. FIG. 5G illustrates exemplary image data in response to which the processor 111 may generate a horizontal face out trigger, whereas FIG. 5H illustrates exemplary image data in response to which the processor 111 may generate a vertical face out trigger.

It is to be appreciated that the above described triggers are exemplary and embodiments of the development may or may not include particular triggers described above. Similarly, embodiments of the development may include triggers not described above. For example, a hand or palm detect trigger can be generated by the processor 111 when a hand or palm is detected in a camera's field of view.

As mentioned above, in response to generation (or reception) of the above-described triggers, the processor can be configured to perform specific functions, including the generation of additional triggers. The functional effects of the system are described below with reference to their output and general effects on the state of the system.

In response to generating or receiving particular triggers, the processor 111 can generate an alert. An alert can include textual, graphical, audio, or haptic (e.g., vibration) output indicative to the user that a trigger or sequence of triggers has occurred. The alert can include transitory alerts, such as an audio message stating "Red user has logged in," or stable, such as a red LED light indicating that the red user is currently logged in (e.g., that there exists a profile stored in the memory having the "red" profile identifier and indicating that the red user is in the "logged in" state).

In one embodiment, the state of a plurality of users is displayed, indicating which of the users are logged in. For example, a plurality of LEDs may or may not be illuminated depending on the state of the profile associated with the profile identifier associated with the LED.

In another embodiment, the alert indicates that the consumer electronic device 101 requests further input from one or more users. For example, if a face detected trigger is generated or received, the device 101 may request that the newly detected user login within a predetermined time.

In response to generating or receiving particular triggers, the processor 111 can perform internal auto adjustments. The auto adjustments include internal state change modification that is carried out in response to specific triggers or patterns of triggers. Auto adjustments can include changes to the memory. When the input device 120 includes a camera, the auto adjustments can include changes to the camera, for example, its field of view.

The auto adjustments can include user login, user logout, user swapping, and hot zone updating. For example, in response to the user login trigger indicating that a login gesture was detected, the processor 111 can store a profile in the memory 112 as described above with respect to FIG. 2. In response to the user logout trigger indicating that a logout gesture was detected, the processor 111 can delete the profile stored in the memory 112. In response to the face out trigger, the processor 111 can generate an updated hot zone for a particular profile and store the updated hot zone in the profile in the memory 112.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A system for maintaining login state information, the system comprising:
   a memory configured to store the login state information;
   a camera configured to capture an image; and
   a processor configured to:
   determine, based at least in part on the image data, a location of a central object associated with the user;
   determine, based at least in part on the image data, a location of a first satellite object associated with the central object;
   modify, based at least in part on the relative location of the satellite object with respect to the location of the central object, the login state information to indicate that the user has logged in;
   store a hot zone for the user, wherein the hot zone is a portion of the field of view of the camera and the portion is a predefined size and shape centered on the location of the central object;
   at a later time, detect a logout gesture within the hot zone, by determining the locations of the central object and the first satellite object;
   modify the login state information to indicate that the user has logged out when the logout gesture within the hot zone matches a logout gesture stored for the user, but only if the central object and first satellite object are located in the hot zone.

2. The system of claim 1, wherein the processor is configured to determine, based at least in part on the relative location of the first satellite object with respect to the location of the central object, an angle and to modify the login state information to indicate that the user has logged in based on the angle.

3. The system of claim 1 further comprising an output device configured to provide an audiovisual indication that the user has logged in.

4. The system of claim 3, wherein the output device comprises at least one of a speaker, an LED, or a display.

5. The system of claim 1, wherein the processor is configured to determine a profile based on the angle and to modify the login state information to indicate that the user has logged in to the profile.

6. The system of claim 5, wherein the memory is configured to store a table associating a plurality of login gestures with a respective plurality of profiles.

7. The system of claim 1, wherein the camera is a video camera configured to capture a plurality of successive images.

8. The system of claim 1, wherein the processor is configured to determine a location of a face of the user and a location of a palm of the user.

9. A method of maintaining login state information, the method comprising:
   receiving image data;
   determining, based at least in part on the image data, a location of a first central object;
   determining, based at least in part on the image data, a location of a first satellite object;
   associating the first satellite object with the first central object when the first central object is the closest central object to the first satellite object;
   determining, based at least in part on the image data, a location of a second satellite object;
   associating the second satellite object with the first central object when the first central object is the closest central object to the second satellite object;
   determining, based at least in part on the image data, a location of a third satellite object;
   associating the third satellite object with a second central object even though the first central object is closer to the third satellite object than the second central object is; and
   modifying, based at least in part on the relative location of the first and second satellite objects with respect to the location of the first central object, and based at least in part on a profile of a user, the login state information to indicate that the user has logged in.

10. The method of claim 9,
    wherein determining the location of the first central object comprises determining one or more central coordinates indicative of the location of the first central object;
    wherein determining the location of the first satellite object comprises determining one or more first satellite coordinates indicative of the location of the satellite object;
    further comprising determining a metric based at least in part on the central coordinates and satellite coordinates; and
    wherein modifying the login state information comprises modifying the login state information based at least in part on the metric.

11. The method of claim 9, wherein the metric is an angle.

12. The method of claim 9, wherein determining a location of a central object comprises determining a location of a head or a face of the user.

13. The method of claim 9, wherein determining a location of a satellite object comprises determining a location of a hand or a palm of the user.

14. The method of claim 9, determining a location of a satellite object associated with the central object comprises determining a location of a first satellite object associated with the central object and determining a location of a second satellite object associated with the central object.

15. The method of claim 14, further comprising determining an angle based at least in part on the location of the central object, the location of the first satellite object, and the location of the second satellite object.

16. The method of claim 15, wherein modifying the login state information comprises modifying the login state information, based at least in part, on the angle.

17. The method of claim 9, further comprising outputting an indication that the user has logged in.

18. A system for maintaining login state information, the system comprising:

means for determining, based at least in part on the image data, a location of a central object associated with the user;

means for determining, based at least in part on the image data, a location of a first satellite object associated with the central object;

means for modifying, based at least in part on the relative location of the satellite object with respect to the location of the central object, the login state information to indicate that the user has logged in;

means for storing a hot zone for the user, wherein the hot zone is a portion of the field of view of the camera and the portion is a predefined size and shape centered on the location of the central object;

means for, at a later time, detecting a logout gesture within the hot zone, by determining the locations of the central object and the first satellite object;

means for modifying the login state information to indicate that the user has logged out when the logout gesture within the hot zone matches a logout gesture stored for the user, but only if the central object and first satellite object are located in the hot zone.

19. A non-transitory computer-readable storage medium having computer-executable code stored thereon which, when executed by a computer, causes the computer to perform a method of maintaining login state information, the method comprising:

receiving image data;

determining, based at least in part on the image data, a location of a first central object;

determining, based at least in part on the image data, a location of a first satellite object; associating the first satellite object with the first central object when the first central object is the closest central object to the first satellite object;

determining, based at least in part on the image data, a location of a second satellite object;

associating the second satellite object with the first central object when the first central object is the closest central object to the second satellite object;

determining, based at least in part on the image data, a location of a third satellite object;

associating the third satellite object with a second central object even though the first central object is closer to the third satellite object than the second central object is; and modifying, based at least in part on the relative location of the first and second satellite objects with respect to the location of the first central object, and based at least in part on a profile of a user, the login state information to indicate that the user has logged in.

\* \* \* \* \*